United States Patent [19]

Cameron

[11] Patent Number: 4,547,353
[45] Date of Patent: Oct. 15, 1985

[54] APPARATUS AND PROCESSES FOR THE CONCENTRATION OF SULPHURIC ACID

[75] Inventor: Gordon M. Cameron, North York, Canada

[73] Assignee: C-I-L Inc., North York, Canada

[21] Appl. No.: 684,077

[22] Filed: Dec. 20, 1984

[30] Foreign Application Priority Data

Jan. 27, 1984 [CA] Canada ................... 446257

[51] Int. Cl.⁴ .................. C01B 17/98; C01B 17/48; B01D 47/00
[52] U.S. Cl. ................... 423/522; 422/161; 55/73; 55/226; 261/23 R
[58] Field of Search ........ 423/522, 531, 533; 261/23 R, 125, 95; 422/160, 161; 55/73, 344, 226

[56] References Cited

U.S. PATENT DOCUMENTS

| | | |
|---|---|---|
| 1,576,705 | 3/1926 | Babcock ............... 422/161 |
| 1,605,004 | 11/1926 | Shapleigh ............. 422/522 |
| 1,943,137 | 1/1934 | Mullen ................. 423/522 |
| 2,038,318 | 1/1936 | Carter ................. 55/73 |
| 2,147,161 | 2/1939 | Haglund ............... 422/161 |
| 3,950,493 | 4/1976 | Dörr et al. ........... 423/522 |
| 4,029,751 | 6/1977 | Dörr et al. ........... 423/522 |
| 4,064,223 | 12/1977 | Maier et al. .......... 423/522 |
| 4,239,711 | 12/1980 | Dick et al. ........... 55/73 |
| 4,348,373 | 9/1982 | Schoubye ............. 423/522 |

FOREIGN PATENT DOCUMENTS

| | | | |
|---|---|---|---|
| 687160 | 2/1953 | United Kingdom ........ 423/522 |
| 1215766 | 12/1970 | United Kingdom ........ 423/522 |
| 1288835 | 9/1972 | United Kingdom ........ 423/522 |
| 186402 | 11/1966 | U.S.S.R. ................. 423/522 |

*Primary Examiner*—Gary P. Straub
*Attorney, Agent, or Firm*—C. Brian Barlow

[57] ABSTRACT

A process for producing concentrated sulphuric acid from a hot gas stream comprising water and sulphur trioxide which process comprises feeding a first portion of said gas stream through a first sulphur trioxide absorption zone and a second portion through a second sulphur trioxide absorption zone; feeding a recycled sulphuric acid stream to said first sulphur trioxide absorption zone whereby substantially all of the sulphur trioxide and sulphuric acid are removed from said first portion of said gas stream to produce an enlarged sulphuric acid stream; recycling a first portion of said enlarged sulphuric acid stream through said first sulphur trioxide absorption zone; feeding a second portion of said enlarged sulphuric acid stream to said second sulphur trioxide absorption zone; and collecting sulphuric acid product from said second sulphur trioxide absorption zone; wherein the ratio of gases to sulphuric acid in said second sulphur trioxide absorption zone is such that the sulphuric acid product leaving said zone is of the desired concentration to a maximum of the azeotropic concentration. The process is of value in the production of concentrated sulphuric acid from waste sulphuric acid.

3 Claims, 2 Drawing Figures

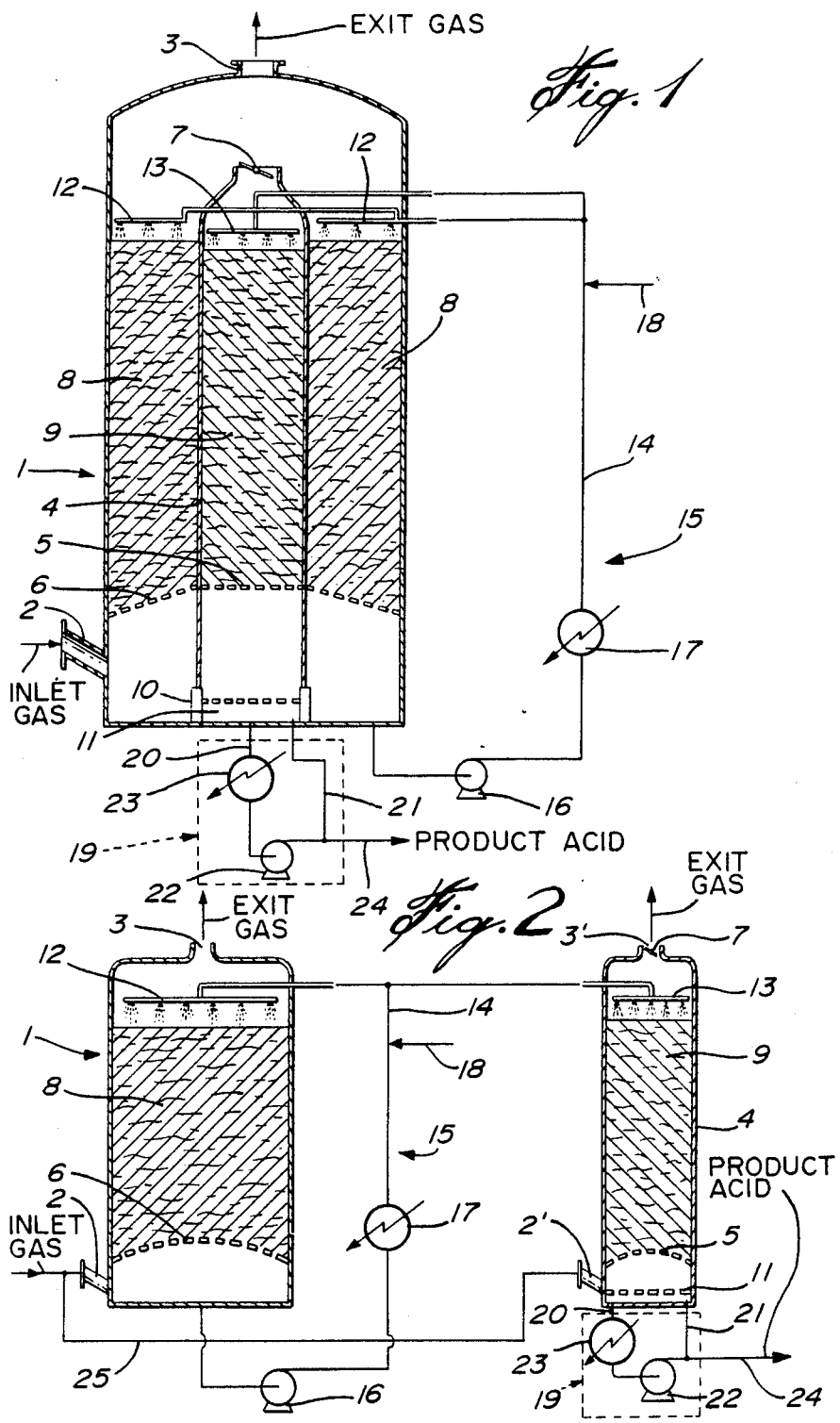

APPARATUS AND PROCESSES FOR THE CONCENTRATION OF SULPHURIC ACID

This invention relates to apparatus and processes for the production of concentrated sulphuric acid and, more particularly, to the production of concentrated sulphuric acid from waste sulphuric acid.

Waste sulphuric acid may be obtained from a variety of operations such as the alkylation or nitration of aromatic compounds, the drying of chlorine and similar materials, and from titanium dioxide manufacture. While the disposal of this waste acid has long been a problem, a solution has become increasingly urgent since these wastes, if not treated, present a threat to the environment.

One method of recovering this waste acid is to subject it to thermal degradation to produce sulphur trioxide and water vapour, and to recover said gas and water vapour Some water may be retained in the form of sulphuric acid vapour, but as the degradation temperature increases the equilibrium between $SO_3$, $H_2O$ and $H_2SO_4$ is overwhelmingly displaced towards $SO_3$ and $H_2O$. At 500° C., there is almost complete degradation of acid into $H_2O$ and $SO_3$. One such thermal degradation process involves spray drying, hot gas fluidized bed combustion. Impurities are either burned or allowed to separate as solids. Other routes by which such mixtures of sulphur trioxide and water and carrier gases can be obtained include catalysis of gases containing sulphur dioxide and oxygen and moisture such as would be obtained from combustion of hydrogen sulphide, high sulphur fuel oils or similar wastes.

In almost all cases where such gases can be formed, the quantity of water in the gas stream is in excess of that needed for production of concentrated sulphuric acid product and a total condensation or absorption of the sulphur trioxide and water to form a dilute acid product stream does not give a saleable product. In most cases where gases containing sulphur dioxide and water are formed, the gas streams are cleaned and cooled to the point where the water and sulphur dioxide contents allow conventional grades of sulphuric acid to be formed using the conventional routes for conversion of dry sulphur dioxide gas into sulphuric acid.

Simple scrubbing operations are known in which the recovery of the sulphur trioxide is carried out in an absorption system in such a way that the sulphur trioxide content in the vapours is reduced to a very low level while significant water vapour pressure is still maintained. Such operations involve acid concentrations below the normal product range in which elevated temperatures are used for the absorption process and in which acid strengths are typically held below 85% to avoid acid leaving the absorption step in the vapour phase. Here, however, the acid produced is still below the normal acid strength required in the marketplace and in most processes and must be concentrated if an acceptable product is to be obtained.

A process has also been used in which a portion of the acid circulating in the absorption step is passed on a once-through basis through the hot gas containing the sulphur trioxide and water vapour in a countercurrent or co-current mode in such a way that excess water and acid are evaporated from the acid portion producing a desired product acid of strength ca 93%. The very hot resultant product acid is then cooled and sent from the process as product. While this approach is proven, it has several defects in that the quantity of acid circulating over the concentration step is very small in comparison to the quantity of gas normally involved, making a good contacting operation very difficult. Further, the degree of concentration and the available heat are the result of upstream processes which makes regulation of the concentration step and temperatures difficult.

This invention has as an object the production of concentrated sulphuric acid from mixtures of sulphur trioxide and water or sulphuric acid and water with a carrier gas stream wherein sulphuric acid of a selected concentration up to the azeotrope can be obtained as product, high temperature operations are kept to a minimum, and the multi-step processing of said gases is avoided and none of the gas stream is processed twice.

The invention further provides a combined operation which can simplify plant layout.

Accordingly, there is provided a process for producing concentrated sulphuric acid from a hot gas stream comprising water and sulphur trioxide which process comprises feeding a first portion of said gas stream through a first sulphur trioxide absorption zone and a second portion through a second sulphur trioxide absorption zone; feeding a recycled sulphuric acid stream to said first sulphur trioxide absorption zone whereby substantially all of the sulphur trioxide and any sulphuric acid are removed from said first portion of said gas stream to produce an enlarged sulphuric acid stream; recycling a first portion of said enlarged sulphuric acid stream through said first sulphur trioxide absorption zone; feeding a second portion of said enlarged sulphuric acid stream to said second sulphur trioxide absorption zone; and collecting sulphuric acid product from said second sulphur trioxide absorption zone; wherein the ratio by weight of gas to sulphuric acid in said second sulphur trioxide absorption zone is such that the sulphuric acid product leaving said zone is of the desired concentration to a maximum of the azeotropic concentration.

In a preferred feature the invention provides a process as hereinbefore defined wherein said first and second sulphur trioxide absorption zones are combined in a single tower. Such a preferred arrangement yields economic savings in plant cost and in maintenance and operations.

In a further feature the invention provides an apparatus for producing concentrated sulphuric acid from a hot gas stream comprising water and sulphur trioxide, which apparatus comprises a first sulphur trioxide absorption zone; a second sulphur trioxide absorption zone; means for feeding a first portion of said gas stream through said first sulphur trioxide absorption zone; means for feeding a second portion of said gas stream through said second sulphur trioxide absorption zone; means for feeding recycled sulphuric acid to said first sulphur trioxide absorption zone whereby an enlarged sulphuric acid stream is produced; means for recycling a first portion of said enlarged sulphuric acid stream through said first sulphur trioxide absorption zone; means for feeding a second portion of said enlarged sulphuric acid stream through said second sulphur trioxide absorption zone; and means for collecting sulphuric acid product from said second sulphur trioxide absorption zone.

In yet a further feature the invention provides an apparatus as hereinbefore defined wherein said first and second sulphur trioxide absorption zones are combined in a single tower.

By the term "hot gas stream" is meant one or more sources of a gaseous mixture comprising water vapour, sulphur trioxide and, optionally, sulphuric acid vapour.

In order that the invention may be better understood several embodiments will now be described by way of example only with reference to the drawings wherein FIG. 1 is a schematic diagram of a preferred apparatus and process according to the invention; and FIG. 2 is a schematic diagram of an alternative embodiment of the apparatus and process according to the invention.

FIG. 1 shows a cylindrical 40' high and 14' diameter absorption tower 1 having walls and base formed of acid resistant brick-lined carbon steel. Tower 1 at a lower part has a gas inlet 2 and at its top a gas exit 3.

Coaxial within the tower 1 is a 7' diameter brick-lined carbon steel chimney 4 on a support 5 which forms part of a packing support 6 extending across the diameter of the tower 1. Chimney 4 is provided with gas control damper means 7. The space above packing support 6 and between the tower wall and chimney 4 is filled with 3" 'INTALOX' TM saddle ceramic packing and constitutes a first sulphur trioxide absorption zone 8. The space above support 5 within chimney 4 is filled with 1" 'INTALOX' saddle ceramic packing and constitutes a second sulphur trioxide absorption zone 9.

Disposed beneath second sulphur trioxide absorption zone 9 is an acid-brick lined weir 10 defining an acid collecting zone 11. Above first and second sulphur trioxide absorption zones 8 and 9 are acid distributors 12 and 13, respectively, each connected to the upper part of a sulphuric acid conduit 14. Conduit 14 constitutes part of an acid recirculation circuit 15 provided with acid pumping means 16 and acid cooling means 17. Conduit 14 is connected to a start-up liquor inlet conduit 18 and, at its lower end, to the base of tower 1 beneath first sulphur trioxide absorption zone 8.

At the base of tower 1 leading from acid collecting zone 11 is an acid recirculation circuit 19 consisting of an acid exit line 20, acid inlet line 21, acid pumping means 22 and acid cooling means 23. Connected to circuit 19 is product acid conduit 24.

In operation, a gas stream (53,000 normal cubic meters/hour) containing 12% sulphuric acid, 16% water, and the balance inerts ($CO_2$, $N_2$, etc.) at a temperature of 300° C. is formed by vaporisation of an acid stream containing 50% sulphuric acid by contact with a hot gas from a furnace at 1000° C. This gas stream contains water vapour in excess of that required in the desired product and enters tower 1 through gas inlet 2 wherein it is split into two streams.

One stream representing 70% of the gas (37,000 normal cubic meters/hour) enters first sulphur trioxide absorption zone 8 wherein it countercurrent contacts sulphuric acid fed from conduit 14 via distributors 12. The sulphuric acid is in such quantity and of such strength and temperature as to allow excess water vapour to remain in the gas stream for emission through gas exit 3, while the sulphur trioxide or sulphuric acid concentration in the exit gas stream is sufficiently low to permit discharge of the exit gas to atmosphere without risk of environmental damage. The acid strength and flow in zone 8 is primarily set by the acid temperatures tolerated by the available materials of construction for the tower, pipes, pumps and cooling equipment. Typical values of this acid stream would be 75% strength acid at a temperature of 120° C. out of distributors 12 and 150° C. after passing through zone 8 at a flow rate of the order of 500 tonne/hour. The quantity of descending acid is sufficient to remove heat from the gas stream and to avoid producing an excessive temperature in the acid leaving zone 8 in order to reduce corrosion. The contacting operation removes over 99.8% of the entering sulphur trioxide and acid values in the gas stream along with sufficient water to form 75% acid. The ratio of acid to gas in zone 8 in the embodiment described is of the order of 13:1.

The other gas stream representing 30% of the inlet gas (16,000 normal cubic meters/hour) enters second sulphur trioxide absorption zone 9 where it also contacts a counter-current sulphuric acid stream fed from conduit 14 via distributors 13. The quantity of gas passing through zone 9 relative to the quantity of sulphuric acid in the zone is such that the heat of this gas is sufficient to concentrate the acid stream to the acid product strength desired. Zone 9 can be considered to constitute at least two zones, a lower and primary evaporation zone in which there is a partial vaporisation of liquid, as a result of the hot gas stream, and an upper zone in which the rising gas is scrubbed of sulphur trioxide and sulphuric acid vapour by descending acid—effecting a resulting condensation of acid from the vapour and a vaporisation of water from the acid stream. The quantity of gas passing through zone 9 is set by gas control damper means 7 to produce a desired grade, in this case, of 93% acid product. The ratio of descending acid to gas in zone 9 is of the order of 0.36 in the embodiment shown, and results in a recovery of 99.7% of the acid values in the gas stream and a net evaporation of water from the cooled acid feed stream. The design and dimensions of zone 9 are based on both vaporisation and mass transfer considerations, unlike zone 8 wherein a simpler scrubbing operation takes place.

Acid obtained from the bottom of zone 8 is recirculated through circuit 15 by means of pump 16 and cooled by acid cooling means 17. In the embodiment shown 1.45% of this recirculating stream is diverted to zone 9.

Acid from zone 9 at a temperature of 230° C. collects in zone 11 wherein it is cooled by a stream of cool acid circulating in circuit 19.

Product acid is run off through conduit 24, while the gas streams emerging from zones 8 and 9 combine, pass through exit 3 and, optionally, to any further operations required prior to discharge to the atmosphere. The quantity of product acid removed is equivalent to the sulphur values recovered in the two absorption zones, while the water recovered is that required in the product stream.

Thus, it can be seen that the main variables in the operation of the process of the invention are the temperature and composition of the inlet gas stream, the fractions of the inlet gas fed to the respective absorption zones, the strength and temperature of the circulating acid and the amounts thereof fed to the respective absorption zones. However, the selection of values for each of these variables for the operation of the process "at steady state" may be readily determined by the skilled man.

The temperature of the inlet gases may generally range from 270° C.–600° C.

Typically, the descending acid to rising gas ratio in the first sulphur trioxide absorption zone differs markedly from that in the second sulphur trioxide absorption zone by a factor of the order of 10–100 depending on the strength of product acid desired and design of the respective absorbing zones.

Generally, recirculating acid of 75% strength is fed to the two absorption zones. However, weaker or stronger acid may be circulated through the system. Even water may be used as the circulating liquid, initially, until acid of increasing strength is produced.

In the process according to the invention as hereinbefore described, each of the two absorption zones handles only a part of the inlet gas stream. This process replaces the classical approach of two towers in series, each handling all of the gas flow. Savings are therefore achieved in reduced pressure losses and in apparatus cost. At the same time, the novel approach according to the invention offers a means of regulating the acid strength of the product by regulation of the relative division of gas between the two contacting zones, an adjustment that is not available in the case of two towers in series.

In a further advantage, the second sulphur trioxide absorption zone allows the contact of 1 unit of gas with 0.36 units of acid, in contrast to the art absorbers in which 1 unit of gas contacts 0.1 unit of acid—a contacting operation which is more difficult to carry out over packing as a result of the very low acid flows involved per unit of gas.

FIG. 2 shows an alternative embodiment of a process and apparatus for concentrating acid wherein the first and second sulphur trioxide absorption zones are in separate towers. The numerals common to FIGS. 1 and 2 denote the same entities. The apparatus shown in FIG. 2 illustrates the second sulphur dioxide absorption zone 9 contained within chimney 4 constituted as a separate absorption tower. This tower is provided with its own distinct gas outlet 3' and gas inlet 2', to which its portion of the total gas stream is fed via conduit 25.

It will be readily envisaged by the skilled man that there are other embodiments according to the invention wherein the arrangement of conduits, acid pumps and acid cooling means may be varied.

I claim:

1. A process for producing concentrated sulphuric acid from a hot wet gas stream comprising water and sulphur trioxide which process comprises feeding a first portion of said gas stream through a first sulphur trioxide absorption zone and a second portion through a second sulphur trioxide absorption zone, said second absorption zone being in parallel flow arrangement with said first absorption zone; feeding a recycled sulphuric acid stream to said first sulphur trioxide absorption zone while removing subtantially all of the sulphur trioxide and sulphuric acid from said first portion of said gas stream to produce an enlarged sulphuric acid stream; recycling a first portion of said enlarged sulphuric acid stream through said first sulphur trioxide absorption zone; feeding the remaining a second portion of said enlarged sulphuric acid stream to said second sulphur trioxide absorption zone; and collecting sulphuric acid product from said second sulphur trioxide absorption zone; wherein the ratio by weight of gas to sulphuric acid in said second sulphur trioxide absorption zone is such that the sulphuric acid product leaving said zone is of greater than 75% concentration to a maximum of the azeotropic concentration.

2. A process as claimed in claim 1 wherein said first and said second sulphur trioxide absorption zones are in a single tower.

3. A process as claimed in claim 1 wherein said first and said second sulphur trioxide absorption zones are each in separate towers.

* * * * *